United States Patent

Hirozawa

[15] 3,675,512
[45] July 11, 1972

[54] CONTROL MECHANISM FOR AUTOMATIC SPEED CHANGE ASSEMBLY

[72] Inventor: Koichiro Hirozawa, Kariya, Japan

[73] Assignee: Aisin Seiki Kabushiki Kaisha, Kariya City, Japan

[22] Filed: May 25, 1970

[21] Appl. No.: 40,236

[30] Foreign Application Priority Data

May 23, 1969 Japan..................................44/40489

[52] U.S. Cl...................................74/869, 74/731, 74/751, 192/56 F
[51] Int. Cl...................B60k 21/00, F16h 47/00, F16h 3/74
[58] Field of Search.................................74/867–869, 731, 74/751; 192/109, 85

[56] References Cited

UNITED STATES PATENTS

| | | |
|---|---|---|
| 3,251,245 | 5/1966 | Foerster....................................74/751 |
| 3,433,096 | 3/1969 | Tuck et al..................................74/731 |
| 3,557,635 | 1/1971 | Tuck..........................................74/731 |
| 2,566,518 | 9/1951 | Farkas....................................74/867 X |
| 2,715,455 | 8/1955 | Miller....................................192/54 X |
| 2,739,679 | 3/1956 | Randol...............................192/109 UX |
| 3,321,056 | 5/1967 | Winchell et al.......................74/869 X |
| 3,383,954 | 5/1968 | McFarland................................74/753 |
| 3,482,669 | 12/1969 | Foster-Pegg..............................192/85 |

Primary Examiner—Arthur T. McKeon
Attorney—Sughrue, Rothwell, Mion, Zinn & Macpeak

[57] ABSTRACT

In an automatic speed change mechanism wherein the speed is changed by selectively engaging and disengaging a plurality of fluid operated friction devices, the line pressure is varied in accordance with the amount of torque being applied to a power transmission member, said power transmission member controlling a line pressure regulating valve for regulating said line pressure in proportion to the value of the transmitted torque applied to the power transmission member of the automatic speed change mechanism.

4 Claims, 11 Drawing Figures

CONTROL MECHANISM FOR AUTOMATIC SPEED CHANGE ASSEMBLY

This invention relates to improvements in and relating to the control mechanism of an automatic speed change mechanism, preferably adapted for use in the automotive vehicle.

Generally speaking, the above kind of control mechanism comprises one or more hydraulic pumping means and a plurality of valves which are so arranged that pressure fluid flows from the pumping means to a plurality of hydraulically operated clutch units or brake units which are optimumly controlled for the realization of a desired combination of gear ratios from various gearing units comprised in the automatic speed change mechanism as a whole, to which the control mechanism according to this invention is fitted. These valves must control as precisely as possible the pressure fluid flows over a wide operational range of the speed change mechanism in such a way that a highest possible performance thereof may be attained so as to meet with the operational requirements at every functional stage of the speed change mechanism. As an example, the hydraulic line pressure prevailing within the mechanism must be precisely and positively controlled for various operative conditions thereof. Under a heavy load condition as met during the starting period of the automotive vehicle, the line pressure should be controlled to a certain high value for providing hydraulically operated clutch units or brake units with ample engaging efforts, so as to transmit a higher output power from the drive engine to the driven vehicle wheels. On the contrary, when the vehicle runs at a high speed or under a lightly loaded condition, the transmitting torque is naturally relatively small, thus the line pressure is set to a lower level. Also, it is highly desirous to perform the engagement and disengagement of the clutch or brake means provided at several places within the speed change mechanism with a least possible shock. It will thus be seen from the foregoing that the function control of the automatic speed change mechanism must be so that the hydraulic line pressure is adjusted depending upon the vehicle running condition. In the prior art automatic speed change mechanism, therefore, the arrangement is such that for satisfying the aforementioned contradictory requirements, the line pressure is controlled in function of the engine throttling degree and the vehicle travelling speed in a certain artificial way. In an alternative way, an accumulator, orifice control valve or the like means is used for the generation of a time lag in the line pressure oil supply to or oil discharge from the clutch or brake means. According to out experiments, these prior proposals are far from the ideal. Especially, substantial obviation of clutching or braking shocks is not satisfied which constitutes naturally a drawback inherent of most concern in the practice of the prior art.

The main object of the invention is to provide an efficient control mechanism for automatic automotive speed change mechanism capable of substantially obviating the hitherto unavoidable clutch shocks appearing in the course of the speed change operation.

In the control mechanism of the above kind and embodying the novel principles of the invention, means are provided for detecting the variation in the transmitted torque appearing at a certain, power-transmitting member continuously provided in the power train of the automatic speed change mechanism; and means for responding to the sensed torque variation for the control of the line pressure.

These and further objects, features and advantages of the invention will appear more specifically when reading the following detailed description of the invention by reference to the accompanying drawings.

In the drawings.

In the following, substantially a preferred embodiment of the invention by reference to the several figures. It should be noted that respective same reference numerals are used for same or similar parts throughout all these figures.

Figure 1:
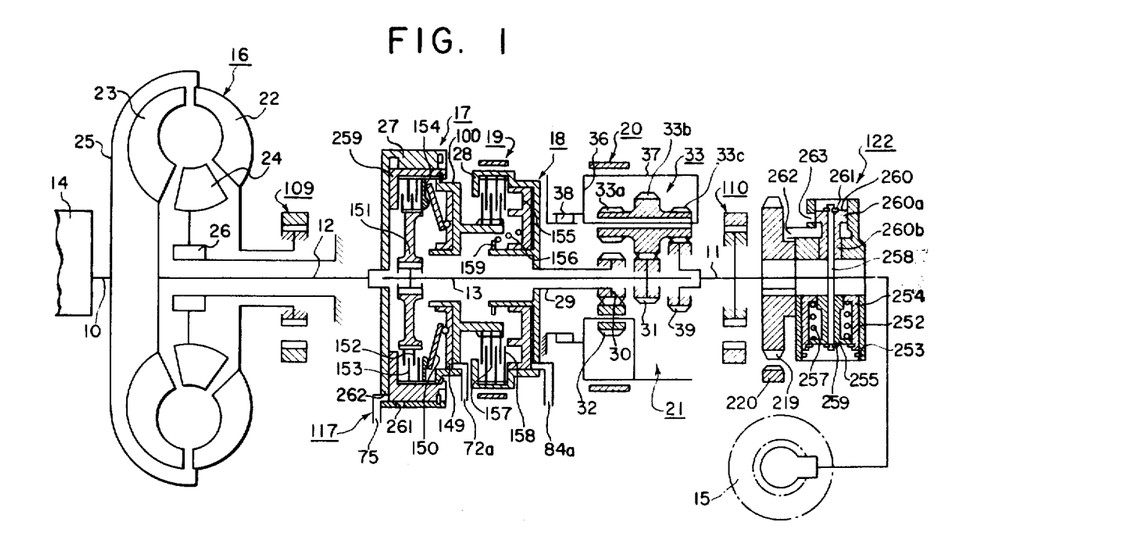
FIG. 1 is a schematic, substantially sectional view of an automotive transmission in which the control mechanism according to this invention is to be fitted.

Referring now to FIG. 1 illustrative of an automotive automatic speed change mechanism in which a fluid adjusting mechanism according to this invention is to be fitted, the numeral 10 denotes an input shaft; 11 an output shaft; and 12 and 13 intermediate shafts.

The input shaft 10 is constituted by the crankshaft of an automotive drive internal combustion engine 14 which is shown only schematically as a part of a rectangular block. The output shaft 11 is mechanically connected through a proper power transmission mechanism, not shown, to a conventional vehicle drive wheel 15. Intermediate shafts 12 and 13 are mechanically connected to respective coupling means, not specifically shown, between the input and output shafts 10 and 11 and in a coaxial way.

The speed change assembly comprises a fluid torque converter generally shown at 16; fluid-operated friction clutch units 17 and 18; fluid-operated friction brake units 19 and 20; and a planetary gearing unit 21.

Fluid torque converter 16 comprises pump impeller 22; turbine runner 23 and stator wheel 24. Pump impeller 22 is mechanically connected through a drive plate 25 to the crankshaft 10 of the engine 14 for being driven thereby. Turbine runner 23 is spline-connected to intermediate shaft 12, although not specifically shown. Stator wheel 24 is connected with one-way clutch 26 shown only in a highly simplified way by two separate rectangular blocks, said wheel 24 being thus rotatable exclusively in the same sense as the pump impeller 22.

Intermediate shaft 12 is mechanically coupled with clutch drum 27 of first clutch unit 17 for performing a unitary rotation therewith. To a transmitting member 259 splined to clutch drum 27 is coupled the inner hub 100 of second clutch unit 18. Inner hub 151 of first clutch unit 17 is splined to intermediate shaft 13, with a sun gear 31 being splined thereto at its rear end for unitary rotation therewith. Clutch drum 28 of second clutch unit 18 is keyed to a hollow sleeve 29 to which a further sun gear 30 is splined. Thus, clutch drum 28, hollow sleeve 29 and sun gear 30 are adapted for unitary rotation as a whole.

Planetary gear 33 comprises gear elements 33a, 33b and 33c arranged physically in series one after another and made rigid into one piece, said gear elements having different numbers of teeth from each other. The planetary gear 33 is rotatably mounted on a support member or carrier 36. This carrier 36 is made integral with a brake drum 37 and mounts in turn rotatably a planetary gear 32 which is adapted for meshing through sun gear 30 with planetary gear element 33a.

Clutch- or brake drum 37 is fitted with one way clutch 38 and rotatable in the same rotational direction with the engine crankshaft 10, a reverse rotation being positively prevented.

Planetary gear element 33 meshed with sun gear 31 and similar gear element 33c meshes with sun gear 39 which is rigidly mounted on the output shaft 11 for rotation therewith.

Numerals 19 and 20 represent separate band brake units which are shown in a highly simplified way only for convenience, said units being arranged for bringing the respective clutch drums 28 and 37, and thus sun gear 30 and carrier 36, respectively, into their rest conditions.

Figure 3:
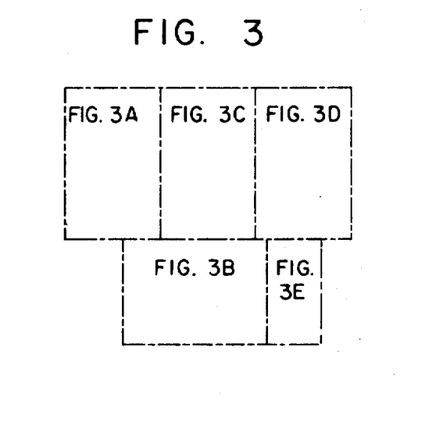
FIG. 3 is an illustrative schema for showing the mutual relationship of FIGS. 3A – 3E which constitute in combination a single drawing demonstrating the control arrangement shown in FIG. 2.
Figure 3A:
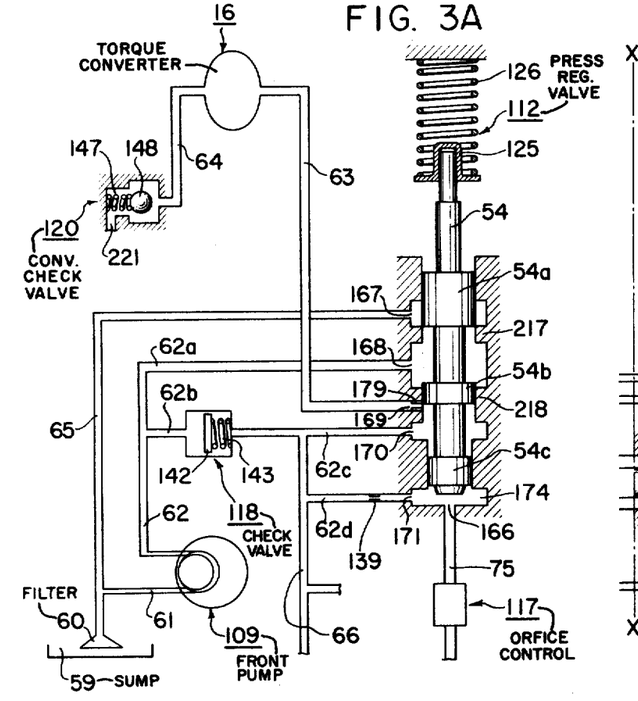
Figure 3B:
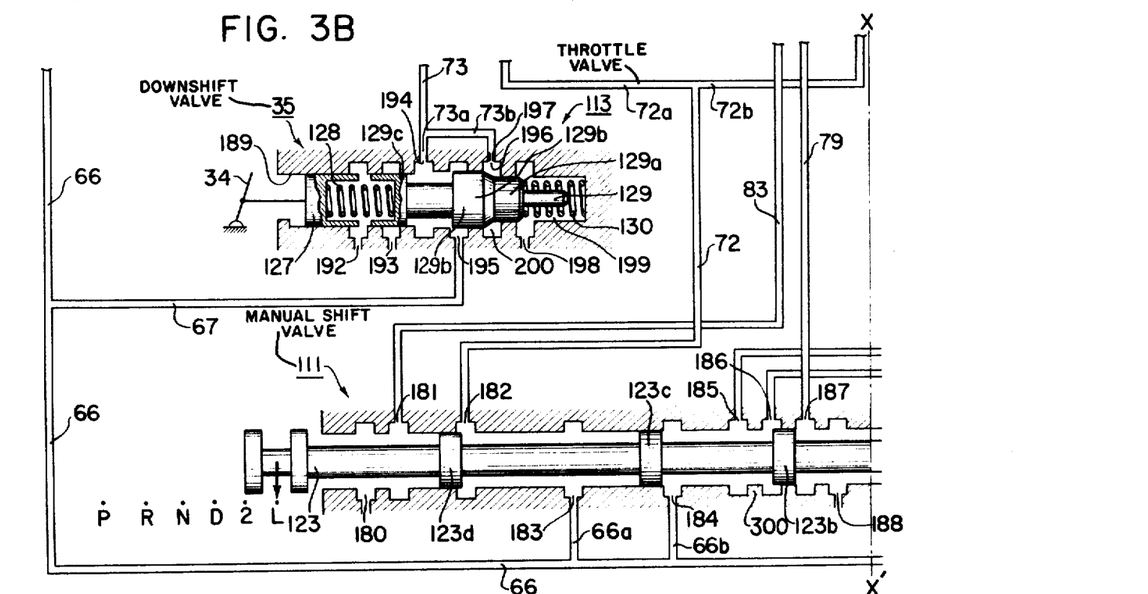

A manually controllable spool valve 111, shown in FIG. 3B, has six control positions, or more specifically P-, R-, N-, D-, 2- and L-positions.

When the spool valve 111 is adjusted to N-position, the speed change mechanism is brought into its neutral position. When the valve is adjusted to L-position, a low speed drive ratio is generally obtained. When the valve is manually shifted, however, from the high speed drive ratio to L-position, a middle speed drive ratio will be at once realized and with the wheel speed reduced to a certain limit, then the low speed drive ratio will be attained finally.

With the valve 111 adjusted to its 2-position, either low speed drive ratio or middle speed drive ratio will be attained, depending upon the wheel speed and the opening degree of the conventional automotive throttle valve, not shown.

With the spool valve 111 adjusted to its D-position, there will be two different operational modes of the speed change mechanism. In this case, when the vehicle is started with low speed drive ratio, the ratio may be adjusted automatically to the middle speed or the high speed drive ratio, depending upon the vehicle speed. Or conversely, when the vehicle speed drops, on automatic control of the transmission at low speed, middle speed and high speed is realized depending upon the vehicle speed.

With the spool valve 111 adjusted to R-position, the reverse drive range will be realized.

With the spool valve 111 adjusted to P-position by means of a selection lever, not shown, pawl 220 is brought into mesh with an outer gear 219 which is keyed to the output shaft 11 for fixing the latter against rotation.

As will be understood from the foregoing, the forward low speed drive ratio can be realized with the spool valve 111 adjusted to either one of L-, 2- and D-position. With the spool valve positioned at L-position, any other speed ratio can not be realized, so far as the selection lever is not operated to other position. The low speed ratio can be realized with the spool valve positioned at L-position by applying hydraulic pressure to pistons 149 and 163 so as to actuate clutch unit 17 and brake unit 20, respectively. The low speed drive ratio thus obtained is in the mode of two-way drive.

The low speed ratio is also realized with the spool valve adjusted to either 2- or D-position, by applying hydraulic pressure to piston 149 to actuate clutch 17. In this case, the former function performed by brake unit 20 is carried into effect by the one-way clutch 38. In this case, the low speed drive is made in the mode of one-way drive only.

In this case, one-way clutch 38 acts as a kind of safety means. Now it is assumed that the vehicle is started with the spool valve 111 positioned at L, ad then the latter is shifted to 2-, or D-position. Then, the second brake unit 20 already applied for providing the low speed drive ratio is disengaged, first brake unit 19 or second clutch unit 18 is engaged, and thus either the middle or high speed drive ratio will be provided. When a lag is required between these sequential operations, for instance, when second brake unit 20 is released in advance of the actuation of the first brake unit or the second clutch unit, the engine 14 will be subjected to a disadvantageous speed increase effect reversely through its crankshaft 10 and a sudden and severe shock would be invited at a succeeding engagement of the first brake or the second clutch. In order to overcome this difficulty, one-way clutch 38 takes over the function of second brake 20 upon release thereof, and an otherwise possible engine speed increase in the above sense is positively prevented until the engagement of first brake 19 or second clutch 18 will have been brought into effect. Thus, it will be clear that one-way clutch 38 acts during the low speed drive stage to prevent any reverse rotation of carrier 36 relative to the regular rotational direction of the engine crankshaft 10, thereby taking over the function of second brake 20. Upon the engagement of first brake 19 or second clutch 18, carrier 36 will start to rotate in the same direction as the crankshaft 10 and one-way clutch 38 will be disengaged automatically at a suitable time, thereby providing a smooth change over from low speed drive ratio to middle or high speed drive ratio. With the low speed drive ratio, rotation is transmitted from first intermediate shaft 12 through first clutch unit 17 to second intermediate shaft 13, with the sun gear 31 acting as the drive element of the gearing 21 being driven. Rotation is thus transmitted from the sun gear 31 to planetary gear elements 33b and 33c, thence to sun gear 39, thereby causing the output shaft 11 to be driven at a reduced rate relative to second intermediate shaft 13. In this case, torque conversion will take place within the torque converter 16 and in the gearing 21 so that the resulting driving torque at the output shaft 11 depends upon the product of the both specific torque ratios at the converter and the gearing. The intermediate speed drive ratio is attained in such away that first clutch unit 17 is engaged, second brake unit 20 is disengaged and first brake unit 19 is engaged. With the intermediate speed drive ratio thus attained, the power transmission is brought about substantially in the same way as with the low speed drive ratio. In this case, however, sun gear 30 is kept stationary by the application of first brake 19, and this sun gear will act as the reaction member in the gearing 21, in place of the carrier 36 in the foregoing stage. With the sun gear 31 rotating in this case in unison with both intermediate shafts 12 and 13, and with the sun gear 39 rotatable permanently in unison with output shaft 11, the gear elements 33b and 33c of the combined planetary gear 33 mesh respectively, while the remaining planetary gear element 33a meshed with planetary gear 32 mounted on the carrier 36 and kept in meshing with sun gear 30, said carrier acting as such for said planetary gear 33. Since, at the present stage, the sun gear 30 is kept stationary by the application of first brake 19, the carrier 36 rotates in the forward rotational direction. In this way, the sun gear 39 and thus the output shaft 11 is driven at a certain reduced rate relative to the second intermediate shaft 13 which ratio is smaller than the low speed drive ratio.

The intermediate speed drive ratio is obtained in the following two ways: In the first instance, the spool valve 111 is placed in either the 2- or D-position and the vehicle speed is selected within a certain range by manipulating the conventional throttle valve, not shown. In this instance, the spool valve is adjusted from the high speed drive ratio to L-position. With the spool valve positioned at any one of L-, 2- and D-positions, the low speed drive ratio will be realized when the vehicle speed drops below a certain predetermined value. With the spool valve positioned at 2- or D-position, the intermediate speed drive ratio will be realized when the vehicle speed increases beyond a certain value. On the contrary, when the spool valve 111 is being kept at the L-position, a speed change to either the middle or high speed drive ratio can not be realized.

The high speed drive ratio can be realized by manipulating the spool valve 111 to the D-position with the vehicle speed kept at a reasonably high value In this case, first clutch 17 is engaged, first brake 19 and second brake 20 are released and second clutch 18 is engaged, the latter being actuated by applying hydraulic pressure upon its actuating piston 243, as will be described more in detail hereinafter.

With this high speed drive ratio attained, first intermediate shaft 12 drives the sun gear 31 through the intermediary of first clutch unit 17, as in the similar way with the case of the low speed or the intermediate drive ratio. Second clutch 18 acts to connect first clutch drum 27 which is coupled with first intermediate shaft 12, through second clutch drum 28 to sun gear 30. In this way, both sun gears 30 and 31 are driven in unison with each other from first intermediate shaft 12 and the planetary gearing 21 is driven as a rigid unit, said first intermediate shaft and said output shaft being coupled directly in effect with each other.

With the high speed drive ratio thus attained, the torque converter 16 may be said to act only as a kind of fluid coupling, with practically a direct drive being established between input shaft 10 and output shaft 11.

The reverse drive stage can be established by bringing second clutch 18 into engagement along with second brake 20. In this case, power is transmitted from the input shaft 10 through torque converter 16, first intermediate shaft 12, second clutch 18, sun gear 30, planetary gear 32, gear elements 33a and 33c of combined gear 33, and sun gear 39, to the output shaft 11. By the application of second brake 20, planetary gear carrier 36 acts as the reaction member of the gearing 21. In this case, the reaction force of the carrier 36 is directed in the forward drive direction. Since there are two planetary gears 32 and 33 between the driving and driven sun gears 30 and 39, the sun gear 39 and the output shaft 11 are driven in reverse drive direction with a certain reduction rate relative to the first intermediate shaft 12. Under these operating conditions, torque converter 16 functions generally in the torque increasing manner, and thus the torque implied upon the output shaft is defined by the product between the torque increasing factor at converter 16 and that provided by the planetary gearing 21.

Under the neutral condition of the speed change mechanism as realized by adjusting the manually operable valve 111 to N-position, clutches 17 and 18 and brakes 19 and 20 are all kept in their released position. For the application of first brake unit 19, hydraulic pressure is fed to working chamber 245 so as to actuate piston 160, thereby causing rod 162 to be urged to move in its working direction for the application of brake band 40. There is a brake releasing chamber 248 in opposition to the hydraulic working chamber 245, said chamber 248 housing therein a return spring 161 which acts to return the piston 160 for releasing the brake 19 when hydraulic pressure is supplied to the releasing chamber 248 in opposition to that prevailing in the working chamber 245.

For the application of second brake 20, hydraulic pressure is applied to working chamber 251 for actuating piston 163 which is then urged to move against the action of return spring 164 and in the direction for the application of brake band 41.

From the foregoing, the speed change mechanism in which the hydraulic control means embodying the principle according to this invention as will be described hereinafter is fitted can be understood in its general construction and operation.

The hydraulic control mechanism according to this invention comprises generally a front pump means 109, said manually operatable valve 111, a hydraulic pressure regulating valve 112, a throttle adjuster valve 113, a 1-2 position selector valve 114, a 2—3 position selector valve 116, a speed adjuster valve 122. Pump means 109 is of a constant delivery type, preferably that having an impeller gear and an internal tooth gear meshing therewith. Pump means 109 is so designed and arranged that it sucks oil from reservoir 59 through a filter 60 and a suction piping 61, and delivers oil under pressure to a discharge piping 62. As shown schematically in FIG. 1, pump means 109 is so arranged that it is driven from the input shaft 10 through pump impeller 22 of torque converter 16. From the discharge piping 62, piping 66 branches off and is arranged to act as line pressure conduit for providing hydraulic pressure to several friction clutch units as well as brake units which have been described hereinbefore by reference to FIG. 1, as will become more clear as the description proceeds.

Regulating valve 112 acts to regulate the hydraulic pressure in the piping 66. This valve 112 is made up of valve spool 54 having separated lands 54a and 54b and a land 54c having a smaller diameter than leads 54a and 54b, and urged by a return spring 126 through spring mount 125 to move downwardly. The valve spool of the pressure regulator 112 is slidably housed in its valve casing which is formed with several ports 166, 167, 168, 169, 170 ad 171. Ports 170 and 171 are hydraulically connected with the line pressure conduit 66, the latter port 171 being so through the intermediary of a reduced flow passage or orifice schematically shown at 139. Port 167 is hydraulically connected with a conduit 65 which is connected in turn to the suction piping 61 of pump means 109. Port 169 is formed with an orifice 179, only schematically shown, thence through a conduit 63 to the torque converter 16. By selecting the orifice 179 to a proper size, the hydraulic pressure supplied to the converter 16 can be determined at a proper one.

Figure 2:
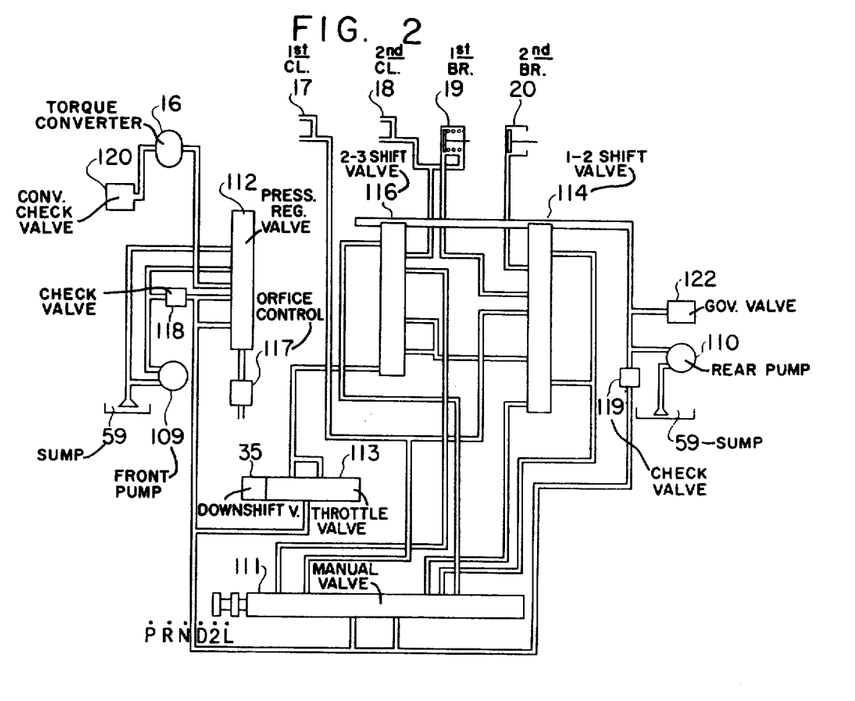
FIG. 2 is a schematic connection diagram showing a control arrangement for the transmission.

Governor type valve 122 shown in FIGS. 1, 2 and 3 develops a hydraulic pressure depending upon the vehicle speed, which hydraulic pressure is utilized for automatically selecting a suitable one of the various speed drive ratios of the speed change mechanism as will be more specifically described hereinafter. This governor valve 122 comprises a casing 252 fixedly mounted on the output shaft 11, a valve member 260 which in slidably mounted within the interior space of said casing 252, a inner weight mass 255, an outer weight mass 254 and a tension spring 257 arranged between said weight masses 254 and 255. These weight masses 254 and 255 and the valve member are arranged at the both sides relative to the output shaft 11. These weight masses and the valve member 260 are limited in their outwardly movable ranges by the provision of a traversely extending rod 258 relative to the output shaft and substantially passing through the governer valve assembly 122, and stop means 259 and 261 which are fixedly, yet detachably mounted at the both extremities of said rod 258. The valve member 260 is formed with two lands 260a and 260b which have different pressure-receiving areas from each other. The governor valve casing 252 is formed with ports 262 and 263 of which the second port 263 is hydraulically connected to oil reservoir 59, although the piping serving for this purpose has been omitted from the drawing for simplicity. Port 262 is connected to the output passage 70 of the rear pump 110 through conduits 71a and 71 and orifice 265, which is shown only schematically in FIG. 3D.

Throttle valve 113 appearing in FIG. 3B in the form of a spool valve is designed and arranged to provide a variable hydraulic pressure in response to position of a conventional automotive accelerator pedal, not shown, for the adjustment of the shift point of the speed change mechanism, and for the control of the hydraulic pressure to be supplied to various clutch units and brake units which have been already described by reference to FIG. 1. The throttle valve 113 is controlled through a downshift valve 35 which comprises a valve member 127 and a bore 189, the latter acting as a discharge port. Valve member 127 is arranged to be operated by means of a suitable mechanical link mechanism, not shown, from the accelerator pedal 34 in such a way, that with the accelerator is moved in the throttle opening direction, the valve member 127 is moved rightwards in FIG. 3B. As commonly known and thus not shown specifically, the accelerator pedal is mechanically connected through a suitable linkage, not shown, with the carburetor for the vehicle drive engine 14.

Figures 3C, 3D:
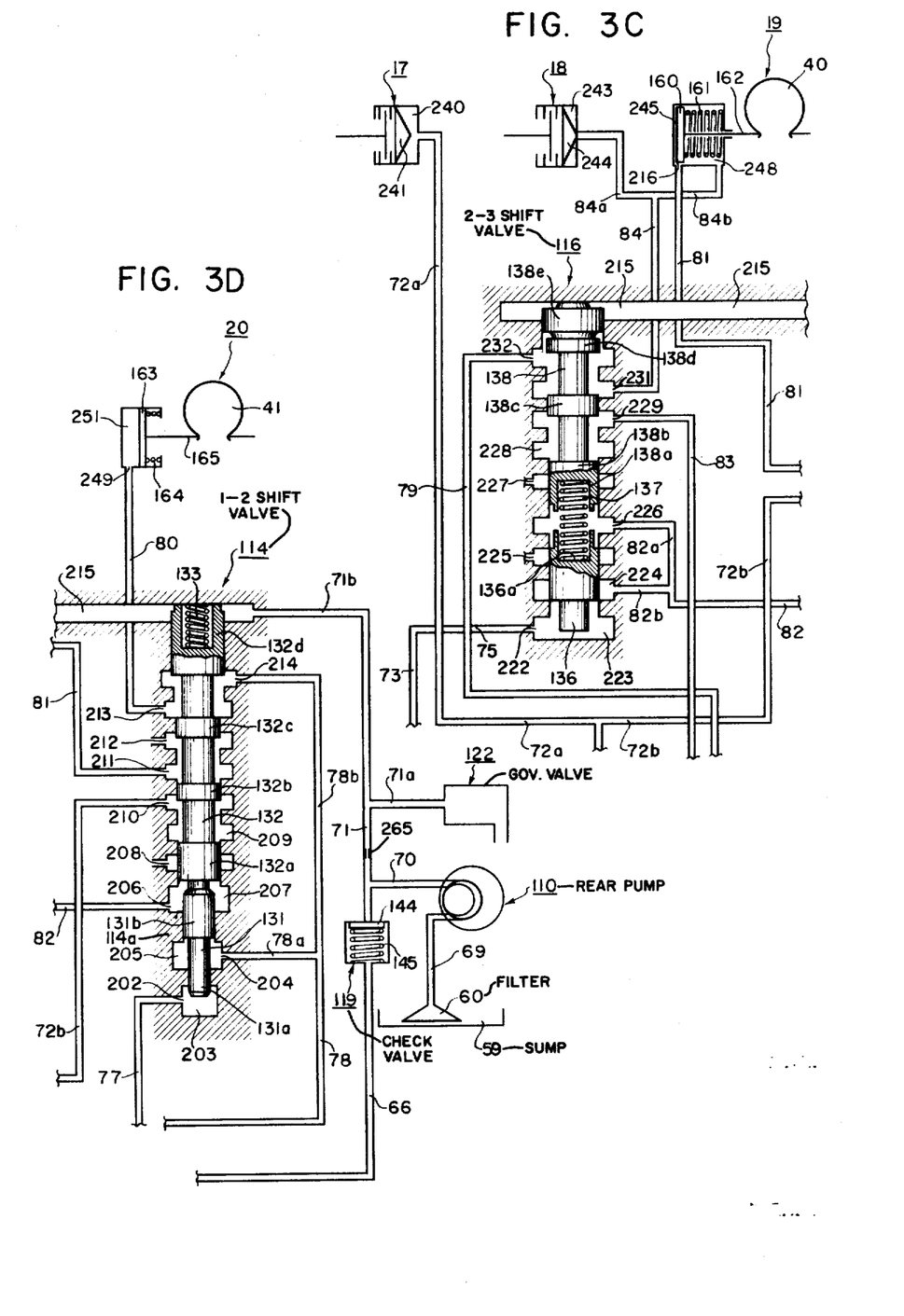
Figure 3E:
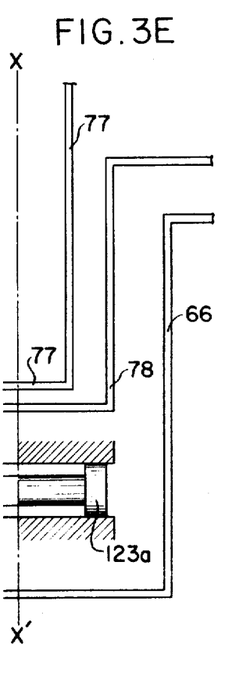
Figure 4:
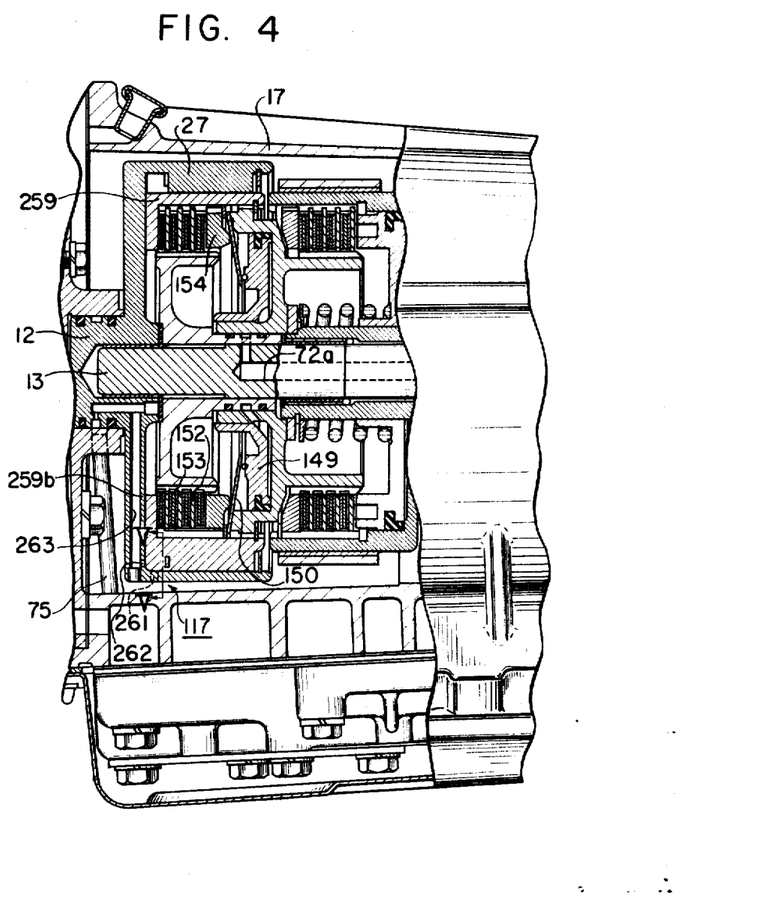
FIG. 4 is an axially sectional view of a part of a preferred embodiment of the invention.

The throttle valve 113 comprises a spool valve member 129 provided with lands 129a, 129b and 129c, on the one hand, and several ports such as at 193, 194, 195, 196 and 198. A spring 128 is inserted under compression between said two valve members 127 right-hand 129. A further spring 130 is provided at the right-hand side of valve member 129 in opposition to said spring 128. Parts 192, 193 and 198 serve for discharge service, while port 195 is connected through a conduit 67 to the line pressure piping 66. Port 196 is formed with an orifice 197, only schematically shown, and connected through conduits 73a and 73b with port 194. Conduits 73a and 73b are connected hydraulically with piping 73 which is connected in turn hydraulically with port 222 of said 2-3 shift valve 116. 2-3 shift valve 116 comprises spool valve members 136 and 138, with a spring 137 being disposed therebetween for urging the spool valve members 136 and 138 to move in opposite directions, as seen in FIG. 3C. The spool valve member 138 is formed with a smallest land 138b, two smaller lands 138c and 138d and a largest land 138e. The valve 116 is further provided with ports 222, 224, 225, 226, 227, 229, 231 and 232 and two chambers 215 and 228. Although the connecting means are not shown for simplicity, ports 225 and 227 serve for conducting hydraulic liquid from the valve to oil reservoir 59. Chamber 228 serves no other purpose than the better and easier cutting of the valve bore. Port 229 is connected through a conduit 83 to port 181 of the manual shift valve 111. Port 231 is connected through conduit 84 and branch piping 84a to the working chamber 243 of second clutch unit 18, on the one hand, and through branch piping 84b to the releasing chamber 248 of first brake unit 19, on the other hand. Port 232 is connected through conduit 79 to port 187 of manual shift valve 111.

1-2 shift valve 114 serves for controlling the vehicle speed between the first speed stage and the second speed stage and operates in such a way that when the first brake unit 19 is actuated, the second brake unit 20 is released, and vice versa. The valve 114 has a valve member 132 which is formed with smallest land 132a, two middle sized lands 132b and 132c and largest land 132d. Valve 114 is further provided with valve member 131 having two lands 131a and 131b of different diameters. Spring 133 is inserted between land 132d of valve member 132 and the main body so as to urge the valve member 132 toward valve member 131. The valve 114 is formed with ports 202, 204, 206 208, 210, 211, 212, 213 and 214, ad with chambers 203, 209 and 215. Ports 208 and 212 are hydraulically connected with oil reservoir 59, although the connecting means are not shown for simplicity, and serve for discharging oil from the valve. Port 202 is connected through conduit 77 to port 185 of the valve 111. Ports 214 and 204 are connected through conduits 78, 78a and 78b to port 186 of the valve 111. Chamber 209 has no other purpose than more convenient and easy mechanical working of the valve bore. Port 206 of 1-2 shift valve 114 is connected through conduits 82, 82a and 82b to ports 224 and 226 of 2-3 shift valve 116.

Port 210 is connected through conduits 72b and 72 to port 182 of the valve 111. Conduit 72 is connected hydraulically with conduit 72a which is connected in turn hydraulically with the actuating chamber at 240 of the first clutch unit 17. Port 211 is connected through conduit 81 to port 216 of the actuating chamber 245 of the first brake unit. Port 213 is connected through conduit 80 to port 249 of the actuating chamber 251 of second brake unit 20.

The operation of the hydraulic adjusting valve arrangement is as follows:

The oil pressure regulating valve 112 serves for the regulation of the hydraulic line pressure to a predetermined pressure prevailing in the piping 66 and various piping means which are kept in communication therewith, for every working condition of the speed change mechanism, as well as the hydraulic pressure regulator mechanism.

When the automotive vehicle is in its parking condition with the engine 14 kept in its idle running or the vehicle runs at a very low speed, the pump means 109 will serve as an oil pressure source for oil pressure regulator valve 112 or various hydraulic piping systems to be described.

In this case, check valve 118 is kept open by virtue of the hydraulic pressure prevailing within the conduit 62b, while check valve 119 is kept in its closed position by virtue of the hydraulic pressure prevailing in the conduit 66 so that no leakage of pressurized oil through the rear pump unit 110 may occur.

When the vehicle is started, the rear pump 110 is actuated and the discharge oil pressure from the pump will increase with increase of the vehicle speed. At a certain vehicle speed, the delivery oil pressure from the rear pump will overcome the combined pressure exerted by spring 145 added with the line pressure, thus check valve 119 is opened and the line pressure delivered from the rear pump will cause check valve 118 to close. At this stage, the rear pump 110 acts as a sole oil pressure source hydraulically connected with the conduit system 66.

At this operational stage, oil is conveyed from front pump 109 to pipings 62, 62a, ports 168, 167 and conduit 65 a suction conduit 61. The fluid oil will only circulate through this hydraulic circuit substantially at a nearly zero pressure.

When the oil pressure regulator valve 112 controls the fluid flow from front pump 109, the regulation is carried out by relying upon the cooperation between the upper surface of valve chamber land 217 of regulator valve 112 and the lower surface of valve collar 54a of valve 54. The regulation of the output pressure flow from the rear pump 110 is brought about by the cooperation between the upper surface of land 218 of regulator valve 212 and the lower surface of collar 54b of valve 54. Therefore, generally speaking, the regulated pressure of the delivered oil from rear pump 110 is somewhat higher than that of the delivered oil from front pump 109. A reduced oil pressure through the orifice 179 provided within port 169 than the line pressure will be conveyed from conduit 63 to torque converter 16. Conduit 64 connects hydraulically the converter 16 with check valve 120 provided in a lubricating oil circuit.

It will be noted that a spring 147 urges check ball 148 of check valve 120 to move in its valve-closing direction so that the valve is effective to maintain the hydraulic pressure within the torque converter 16 at a certain predetermined level.

The port at 221 serves as a lubricating oil supply opening necessary for effective lubrication of various working parts of the speed changer.

The line pressure is regulated in such a way that the hydraulic pressure acting upon the differential area between the valve collars 54b and 54c of valve member 54 of regulator valve unit 112 and that acting upon the valve collar 54c will become balanced out with the spring pressure at 126.

Figure 5:
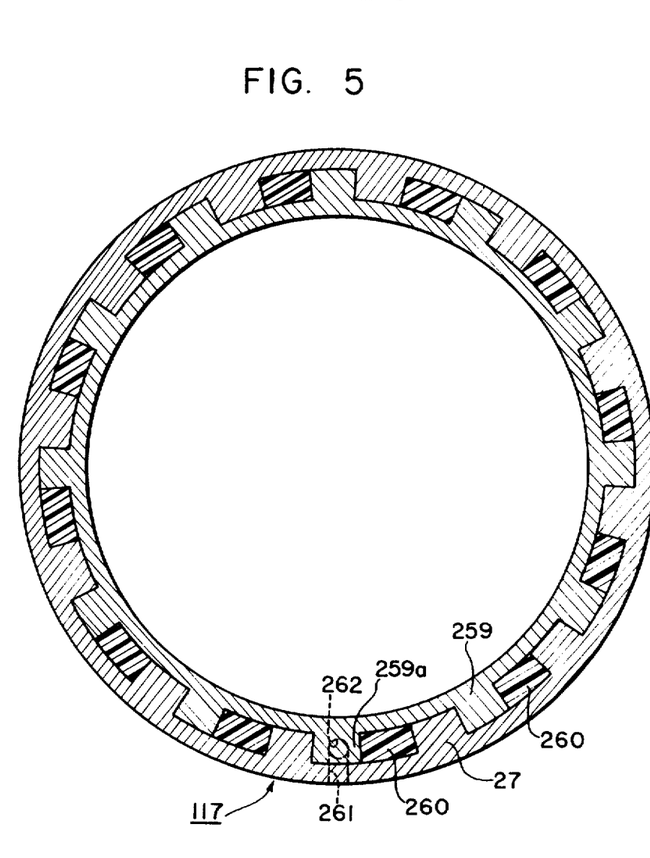
FIG. 5 is a cross-section of the mechanism shown in FIG. 5 taken along a section line V — V shown in FIG. 4.
Figure 6:
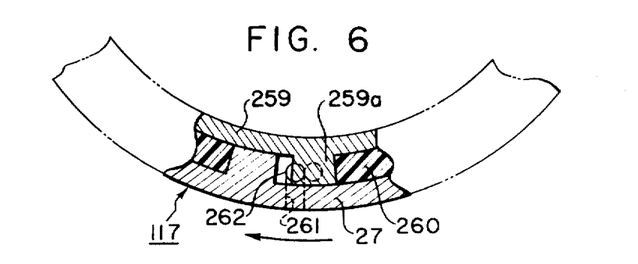
FIG. 6 is a part of FIG. 5, yet showing a different operational mode of the mechanism.

At this stage, the hydraulic pressure acting upon valve collar 54c is variable by virtue of the provision an orifice 139 formed within the conduit 62d for input oil to the chamber 174, as seen in FIG. 3A, orifice means 117, shown in FIGS. 5 and 6 provided with the conduit 75 arranged for discharging oil from chamber 174.

The opening degree of the orifice control means 117 is carried out as shown in FIG. 6. Or more specifically, the control action is performed depending upon the deflection caused in the elastic element 260 by the torque fluctuation appearing between the clutch drum 27 and the transmitting member 259, as appearing during the power-transmitting period.

During the forward drive stage, the clutch 17 is necessarily kept in engagement and the line pressure is set at a somewhat higher level than the necessary theoretical hydraulic pressure at this stage. In this way, the line pressure is adjusted to a higher level with an increase of the transmitting torque and vice versa. Therefore, the line pressure is controlled depending upon the varying value of the transmitting torque. The higher line pressure is necessary for managing the higher transmitting torque from the high power drive engine so as to sufficiently actuate several friction engageable units provided within the speed changer as shown and described so far.

The governor valve 122 will provide the governor pressure which will vary gradually with variation of the governor centrifugal force conveyed to and acting upon the valve member of said governor 122.

At the forward drive stages, the port at 262 in the governor valve 122 will receive the deliver oil pressure from rear pump 110 through orifices 265 and conduits 71 and 71a. The casing 252 of governor 122 rotates with the output shaft 11. With a lower vehicle speed, an oil pressure corresponding to the differential centrifugal force provided between inside and outside weight masses 255 and 254, on the one hand, and that appearing at the valve 260, will act upon the differential area between lands 260a and 260b. With increased driven speed of the driven shaft, the hydraulic pressure will be increased. With increase of the vehicle speed, the outer weight 254 will shift naturally outwards and is received by snap ring 253. The hydraulic pressure acting upon the valve 260 is opposed by the centrifugal force exerted from the inner weight 255 plus the deflected spring force at 257 caused by the outer weight 254. In this way, the combined centrifugal force exerted by the governor weights 254 and 255 will vary in two stages and thus the governor oil pressure will do so in the similar way.

Actuation of accelerator pedal 34 will influence the valve 129 through valve member 127 of downshift valve unit 35, so as to provide a throttling effect upon the oil flow through the conduit 73.

This hydraulic pressure will vary from a nearly zero value appearing when the throttle or orifice is nearly closed to the full line pressure as appearing under full opened condition of the throttle or orifice.

The line pressure is conveyed from conduit 67 to throttle valve 113 ad hydraulic pressure will appear at the both sides of the land 129b, the right-hand side of said land constituting a hydraulic chamber at 200. The pressure will be conveyed through an opening 194 to conduit 73, thence the throttled pressure being conveyed to shift valve 116 for 2-3 transferring operation.

In the following, the adjusting operation will be described more in detail with several operational modes.

Neutral Range

When the vehicle driver manipulates a selector lever, not shown, which is mounted in the neighborhood of the driver'-seat, so as to bring the manual shift valve 111 to its N-position which is the neutral position, the hydraulic line pressure supplied from conduit 66 through ports 183 and 184 will be checked by valve lands 123b and 123c, thus no hydraulic pressure being transmitted to other valve means and several hydraulically actuating piston means for friction clutches and brakes, and thus the speed change mechanism is kept at its neutral piston.

L-Range

When the selection lever is manipulated to adjust the manual shift lever 111 to L-position, the line pressure prevailing in the conduit 66 will be conveyed through the port 184 situated between valve lands 123b and 123c in the drawing, the valve ports 185 and 186. The line pressure also conveyed through port 183 and the valve space between the lands 123c and 123d to port 182. The hydraulic pressure is conveyed from port 186 through conduit 78 to ports 204 and 214 of 1-2 shift value 114. On the other hand, the line pressure will be conveyed through conduit 77 and port 202 to the chamber 203. The combined forces of the hydraulic pressure appearing at this stage in chambers 203 and 205 will act upon the valve 132 upwards in the drawing to L-position where the latter is kept fixed at the low speed position. By this shift movement valve 132, port 214 is brought into communication with port 213, the hydraulic line pressure being thus conveyed through conduit 80 to the actuating chamber 251 of second brake unit 20. At the same time, line pressure will be conveyed from port 182 through conduits 72 and 72a to the actuating chamber 240 of first clutch unit 17. On the other hand, line pressure conveyed through conduits 72 and 72b to port 210 is interrupted by the valve lands 132a and 132b, thus the pressure being confined within a chamber shown at 209. Line pressure will emerge from the conduit 67 through port 195 at the throttle valve 113, appearing at the right-hand chamber 200 of the valve land 129a, and also at the left-hand chamber thereof. Then, the hydraulic pressure is conveyed from port 194 to the throttle pressure conduit 73, thence to port 222 of 2-3 shift valve 116. With lower hydraulic governor pressure prevailing in the chamber 215 and in opposition to the hydraulic pressure prevailing in the chamber 223, chamber 223 communicates with port 224 and the throttle valve pressure is conveyed through conduits 82b and 82a to port 226. Thus, the hydraulic pressure in conduits 82b and 82a becomes equal to the said throttle valve pressure less the spring force 137 and will be conveyed through conduit 82 and port 206 to chamber 207. This hydraulic pressure in chamber 207 serves to position the valve 132 in its low speed position.

In this way the first clutch unit 17 and the second brake unit 20 are brought into actuation, thus the planetary gear carrier 36 is brought into its stationary position. Therefore, the speed change mechanism is adjusted to is first speed stage providing the low speed drive ratio. One-way clutch 38 checks at this stage the carrier 36 in its one running direction which corresponds to the direction of the reaction force induced in the carrier 36 at the stage of first speed drive, yet allowing it to be free to rotate in the opposite direction. Thus, the carrier 36 is allowed to rotate in one direction, yet being fixed by second brake unit 20, it is capable of receiving in effect two directional drive. This is necessary to obtain the desirous engine-breaking effect in the L-range.

By virtue of the hydraulic pressure acting upon the differential pressure receiving area between lands 132c and 132d of the 1-2 position shift valve 114, the hydraulic pressure prevailing in the chamber 203, 205 and 207, the valve 132 is urged to move upwards in the drawing or towards the low speed selecting position and kept in this position, in spite of the value of the governor pressure prevailing in the valve chamber 215.

In this case, therefore, the speed change mechanism is kept in the first speed or the low speed drive stage, unless the selector lever will have been so manipulated that the shift valve 111 is moved from the now occupying L-position.

2-Range

When the shift valve 111 is moved to 2-position by manipulating the selector lever, the valve land 123b is brought to a position where it cooperates with the inwardly projecting ring wall projection 300 situated between ports 185 and 186, thus the hitherto established hydraulic communication between ports 184 and 186 being thereby interrupted. Other hydraulic circuit conditions are same as those of the foregoing L-range operation. In effect, the presently established hydraulic circuit conditions are such that the hydraulic line pressure has been released from the conduit 78 and others are same as before. By virtue of the failure of line pressure in the said conduit 78, the hitherto acted hydraulic pressure upon the differential area between valve lands 132c and 132d becomes void, the hydraulic pressure hitherto conveyed to chamber 205 also becoming void, and the valve will be shifted downwards or to the vehicle high speed drive position, should the vehicle speed be increased and the governor pressure prevailing in the valve chamber 215 increases. In this case, the line pressure in the port 210, having been interrupted by valve lands 132a and 132b, will be conveyed from between lands 132b and 132c to port 211, thence through conduit 81 to the actuating chamber 245 of first brake unit 19. In this way, it will be clear that at lower vehicle speed, the line pressure is applied only to first clutch unit 17, other clutch and brake means being free from application of the line pressure. By virtue of one-way clutch 38 brought into actuation, the low speed drive stage is realized. When the vehicle speed increases and the 1-2 position shift valve 114 is shifted to the high speed side, the line pressure is supplied to the respective actuating chambers 240 and 245 of first clutch 17 and first brake 19, the second or intermediate speed drive stage will be realized. When the accelerator pedal 34 is suddenly depressed when the vehicle is running with the second speed drive stage, although the governor pressure prevailing in chamber 215 does not change substantially, the throttle adjusting pressure prevailing in chamber 207 will increase rather abruptly. Thus, the increased pressure in chamber 207 and the line pressure prevailing in chamber 203 overcomes the governor pressure prevailing in chamber 215 combined with the force of spring 133 so that valves 132 and 131 are urged to move in the upward direction in FIG. 3D of the drawings to their low speed position, the hitherto established hydraulic communication between ports 210 and 211 being interrupted by valve land 132b. Now, a hydraulic communication between ports 211 and 212 is established by the valve space defined by valve lands 132b and 132c. Thus, the application of first brake 19 is released, while the one-way clutch 38 is brought into actuation, thereby establishing the first speed or low speed drive stage being brought into realization. With the vehicle speed increased under these operating conditions, the governor pressure in valve chamber 215 will increase beyond the hydraulic pressure urging the valve towards the low speed drive position. Then the valves 131 and 132 will be shifted towards the high speed drive position, thus the second speed or the intermediate speed operation being brought about. In this way, with the shift valve 111 kept at 2-position, automatic speed change operation will be performed between the first and second speed drive mode.

D-Range

When the shift valve 111 is adjusted to D-position by manipulating the selection lever, the line pressure prevailing in conduit 66 is conveyed through port 183, valve space defined between valve lands 123c and 123d and port 181 to conduit 83, while port 185 hitherto kept in fluid communication with port 184 is interrupted by valve land 123b, and port 185 is brought into communication with discharge port 188. Thus, oil pressure is discharged from chamber 203 of the 1-2 position shift valve 114. With the exception of this, the line pressure is conveyed to same conduits as before where the shift valve 111 is kept at the 2-position.

Line pressure is conveyed from conduit 83 to port 229 of the 2-3 position shift valve 116. With lower vehicle speed and with the governor pressure being low correspondingly, valve 138 is kept at its upper position in the drawing under the action of spring 137, thus being kept at the low speed drive position. The hydraulic line pressure is interrupted at between the valve lands 138b and 138c When the vehicle speed increases under these operating conditions and thus the governor pressure in valve chambers 215 increases correspondingly beyond a predetermined value, it acts to overcome the spring pressure at 137, urging the valve 138 upwards in the drawing, thus moving the valve 138 downwards or towards the high speed drive position. Therefore, line pressure is conveyed from conduit 83 through the port 229, the valve space defined between valve lands 138c and 138d, the port 231, the conduit 84 and branch conduits 84a and 84b, to actuating chamber 243 of second clutch 18 and to releasing chamber 248 of first brake 19, respectively. In this way the clutch 18 is engaged, while the brake 19 is released. By bringing first clutch 17 and second clutch 18 into actuation, the third or high speed drive stage can be realized.

Thus, when valve 111 is placed in the D-position and the vehicle running speed is relatively low, the 2-3 shift valve 116 is positioned at the low speed position while the 1-2 shift valve will be positioned at its high speed position, so as to provide the second speed change. Thus, when the vehicle speed is increased, the 2-3 shift valve 116 is shifted to the high speed position, so as to establish the third speed stage. When the vehicle speed is relatively low, the speed stage will be shifted from the third to the second speed stage.

When it is assumed that the vehicle is running with the second speed stage with the shift valve positioned at D-position and the vehicle speed is less than a certain predetermined value such as 40 km/hr, the throttle valve pressure will increase in an abrupt manner upon sudden depression of accelerator pedal 34 and the throttle pressure prevailing in chamber 207 will increase to overcome the sum of the governor pressure in chamber 215 and the spring force 133, the valve 132 will shift upwards in the drawing, or towards the low speed position, thereby the hitherto established communication between conduits 72b and 81 is interrupted and the line pressure serving for keeping the first brake 19 in its applied position being released through discharge port 212 of valve 114.

In this way, first clutch 17 only is kept in engagement and other engageable means are disengaged, and in addition to the first clutch, one-way clutch 38 is engaged. In this way, the first or the low speed drive stage is brought about.

When further assuming that the vehicle is running at a certain speed below a predetermined value such as 80 km/hr and with D-position having been selected out, and that the accelerator pedal 34 is depressed suddenly under these conditions, the Then, the valve 138 is shifted to the low speed position under the spring action at 137, for realizing the second speed change mode. Or alternatively, when the throttle valve pressure is still higher, while the vehicle speed is comparatively low, the 2-3 position shift valve 116 is shifted to the low speed position as before. At the 1-2 position shift valve 114, the throttle regulating pressure prevailing in chamber 207 overcomes the governor pressure force in the valve chamber 215 and the valve 132 is shifted to the low speed position, thereby the first speed mode being brought about. In this way, a kickdown operation either to the second or the first speed mode can be realized, depending upon the more or lesser degree of depression of the accelerator pedal, on the one hand, and the vehicle running speed occasionally being realized, on the other hand.

Manual Down Shift

With the speed change mechanism so far shown and described, a manual down shift from the high speed drive ratio may be attained with the selector lever set to D-position, to either the intermediate drive ratio or the low speed drive ratio, by adjusting said lever to 2-or L-position, respectively. In addition, a manual down shift from the intermediate speed drive ratio with the selector lever set to 2-position, to the low speed drive ratio by shifting the lever to L-position.

When it is desired to make a manual down shift either from D-position or 2-position to L-position, specifically selected from the various manual shift possibilities above mentioned, and when the low speed drive ratio is desired to realize in spite of occasional faster running speed of the vehicle, the desired operation will be checked from its practical realization when an excessively high running speed of the engine is not effectively prevented, because the speed change mechanism will act to prevent the shift to the low speed drive ratio.

The above specific kind of down shift operation is checked in the following way:

When the selector lever set to D-position or 2-position to provide the high or intermediate drive ratio, respectively, is manually shifted down to L-position so as to invite an engine braking condition during vehicle running, the governor pressure will generally become higher than otherwise normal value, because of that in this case the accelerator pedal has been returned to such position as closing the throttle and thus the throttle valve pressure becomes nearly nil value, thus the latter pressure providing substantially no effect upon the operation of adjusting valve 122. With the vehicle speed over a certain predetermined value, the valve-urging governor pressure at 114 will overcome line pressure conveyed to chambers 203 and 205 and a down shift operation can not be realized. In this case, the shift valve is kept at 2-position. Only when speed seed has dropped beyond a certain value, the valve 132 will be moved upwards in FIG. 3A to the position destined for the low speed, thus the desired low speed drive ratio being realized.

Rear Drive:

By manipulating the selector lever so as to shift the manual shift valve 111 to R-position which means that for rear drive, line pressure will be conveyed to ports 185, 186 and 187. The line pressure conveyed from port 185 to the chamber 203 of 1-2 position shift valve 114 acts in cooperation with that which is conveyed from port 186 to port 204 of the valve 114 upon the valve members 131 and 132 for fixingly positioning it at the position destined for the low speed drive stage. Under these operative conditions, line pressure will be conveyed from said port 186 through ports 214 and 213 of valve 114 to the actuating chamber 251 of second brake unit 20, thus the latter being brought into engagement. On the other hand, the line pressure conveyed from port 187 through conduit 79; port 232 of 2-3 position shift valve; the valve space defined between lands 138c and 138d of valve 138; port 231 and conduits 84, 84a and 84b, to the actuating chamber 243 of second clutch 18, on the one hand, and to the release chamber 248 of first brake unit 19, on the other hand. Thus, the clutch 18 is brought into engagement, while the brake 19 is released. At this stage, the actuating chamber 240 of first clutch 17 is kept in fluid communication through conduits 72a and 72; and port 182 of manual shift valve 111, to discharge port 180. Therefore, the first clutch unit is kept in its released position.

By bringing the second clutch and the second brake into engagement in the above mentioned way, the rear drive stage is brought about as desired.

From the foregoing, it will be clear that the variable speed mechanism according to this invention provides a highly simplified hydraulic circuit arrangement in comparison with the comparative conventional one wherein the governor pressure and the throttle pressure are applied to the shift valve means in the opposite sense to each other and the differential hydraulic pressure is utilized for performing the speed change operation, because in the former case the conventionally employed hydraulic circuit between the throttle valve and one or more of shift valves. In addition, it is not absolutely necessary to mount said throttle valve in proximity to the shift valve means which fact further contributes in the simplification of the necessary hydraulic circuit arrangement. The design, manufacture and arrangement of the valve bodies can also be simplified and made easier than conventional.

The embodiments of the invention in which an exclusive property or privilege is claimed are defined as follows:

1. In a control mechanism for an automatic speed change device for an automotive vehicle adapted for selectively obtaining different gear ratios by selectively applying line pressure to a plurality of frictionally engageable means, the improvement comprising in combination: a source of hydraulic fluid pressure, passage means communicating said fluid pressure source with said frictionally engageable means, a pressure regulator valve operatively connected in said passage means for regulating the line pressure therein, and pressure control means mechanically connected in the gear train of said automatic speed change device for sensing the torque transmitted therethrough, said pressure control means being operatively connected between said passage means and said pressure regulator valve for controlling said pressure regulating valve in response to the torque transmitted through said automatic speed change device to increase said hydraulic line pressure with an increase in the transmitted torque.

2. The improvement as set forth in claim 1, wherein said pressure control means comprises a variable orifice means operatively connected in said automatic speed change device and actuated by the torque transmitted therethrough, said pressure regulating valve being variably adjusted in response to the degree of opening of said variable orifice.

3. The improvement as set forth in claim 1, wherein said pressure control means is provided in a front clutch drum of said automatic speed change device, said front clutch drum being connected rigidly with a shaft of a turbine wheel of a torque converter therein.

4. The improvement as set forth in claim 1, wherein said pressure control means comprises a torque transmitting member having an inner toothed spline engaging a clutch drive plate of one of said frictionably engageable means and an outer toothed spline engaging a second inner toothed spline formed on a clutch drum, said inner toothed spline on said clutch drum and said outer toothed spline on said torque transmitting member having a peripheral gap formed therebetween, an opening formed in said clutch drum communicating with said pressure regulating valve by said passage means, a discharge opening formed in said clutch drum and communicating with said opening communicating with said pressure regulating valve, and a deformable elastic means fitted in said gap formed between said inner and outer toothed splines and being elastically deformable as a function of the torque transmitted from said clutch drum to said transmitting member for controlling the opening and closing of said discharge opening to control said pressure regulating valve in response to torque transmitted therethrough.

4. The improvement as set forth in claim 1, wherein said pressure control means comprises a torque transmitting member having an inner toothed spline engaging a clutch drive plate of one of said frictionably engageable means and an outer toothed spline engaging a second inner toothed spline formed on a clutch drum, said inner toothed spline on said clutch drum and said outer toothed spline of said torque transmitting member having a peripheral gap formed therebetween, an opening formed in said clutch drum communicating with said pressure regulating valve by said passage means, a discharge opening formed in said clutch drum and communicating with said opening communicating with said pressure regulating valve, and a deformable elastic means fitted in said gap formed between said inner and outer toothed splines and being elastically deformable as a function of the torque transmitted from said clutch drum to said transmitting member for controlling the opening and closing of said discharge opening to control said pressure regulating valve in response to torque transmitted therethrough.

* * * * *